(12) United States Patent
Yamaguchi et al.

(10) Patent No.: US 12,673,900 B2
(45) Date of Patent: Jul. 7, 2026

(54) SINTERED BODY

(71) Applicant: MITSUI MINING & SMELTING CO., LTD., Tokyo (JP)

(72) Inventors: Yasuhide Yamaguchi, Omuta (JP); Naoki Fukagawa, Omuta (JP)

(73) Assignee: MITSUI KINZOKU COMPANY, LIMITED (JP)

( * ) Notice: Subject to any disclaimer, the term of this patent is extended or adjusted under 35 U.S.C. 154(b) by 1106 days.

(21) Appl. No.: 17/433,259

(22) PCT Filed: Jan. 30, 2020

(86) PCT No.: PCT/JP2020/003368
§ 371 (c)(1),
(2) Date: Aug. 24, 2021

(87) PCT Pub. No.: WO2020/179296
PCT Pub. Date: Sep. 10, 2020

(65) Prior Publication Data
US 2022/0055950 A1 Feb. 24, 2022

(30) Foreign Application Priority Data

Mar. 7, 2019 (JP) ................................. 2019-041275

(51) Int. Cl.
*C04B 35/50* (2006.01)
*C04B 35/515* (2006.01)
(Continued)

(52) U.S. Cl.
CPC .......... *C04B 35/50* (2013.01); *C04B 35/5156* (2013.01); *C04B 35/553* (2013.01);
(Continued)

(58) Field of Classification Search
None
See application file for complete search history.

(56) References Cited

U.S. PATENT DOCUMENTS

2014/0002900 A1* 1/2014 Makikawa ............ G02F 1/0036
252/583
2014/0239228 A1* 8/2014 Ishizawa ............ C09K 11/7733
252/301.4 S
(Continued)

FOREIGN PATENT DOCUMENTS

JP 2003146755 A * 5/2003 ............. C04B 35/50
JP 2016-98143 A 5/2016
(Continued)

OTHER PUBLICATIONS

Machine Translation of KR-20190017333-A ("Lee") (Year: 2019).*
(Continued)

*Primary Examiner* — Amber R Orlando
*Assistant Examiner* — Paul Alan Forsyth
(74) *Attorney, Agent, or Firm* — Harness, Dickey & Pierce, P.L.C.

(57) ABSTRACT

A sintered material is provided having a phase of a compound at least containing a rare earth element and fluorine, the sintered material having an L* value of 70 or more in the L*a*b* color space. The crystal grains of the sintered material preferably has an average grain size of 10 μm or less. The sintered material preferably has a relative density of 95% or more. The sintered material preferably has a three-point flexural strength of 100 MPa or more. The sintered material preferably contains no oxygen, or preferably has an oxygen content of 13% by mass or less when containing oxygen. The compound is preferably rare earth element fluoride or oxyfluoride.

9 Claims, 1 Drawing Sheet

Example 1

(51) Int. Cl.

| | |
|---|---|
| *C04B 35/553* | (2006.01) |
| *C04B 35/64* | (2006.01) |

(52) U.S. Cl.

CPC ........ *C04B 35/64* (2013.01); *C04B 2235/445* (2013.01); *C04B 2235/656* (2013.01); *C04B 2235/666* (2013.01); *C04B 2235/77* (2013.01); *C04B 2235/786* (2013.01); *C04B 2235/9646* (2013.01); *C04B 2235/9661* (2013.01)

(56) References Cited

U.S. PATENT DOCUMENTS

| | | | |
|---|---|---|---|
| 2015/0096462 A1 | 4/2015 | Fukagawa et al. | |
| 2015/0307715 A1* | 10/2015 | Sato .......................... | C23C 4/04 |
| | | | 106/287.26 |
| 2016/0326058 A1 | 11/2016 | Nagayama et al. | |
| 2017/0140902 A1 | 5/2017 | Simpson et al. | |
| 2017/0250057 A1 | 8/2017 | Simpson et al. | |
| 2017/0305796 A1* | 10/2017 | Yano ..................... | C04B 35/553 |

| | | | | |
|---|---|---|---|---|
| 2019/0345069 A1* | 11/2019 | Kajino | .................... | C04B 35/50 |
| 2020/0002799 A1 | 1/2020 | Hamaya et al. | | |
| 2024/0102142 A1 | 3/2024 | Hamaya et al. | | |

FOREIGN PATENT DOCUMENTS

| | | | | | |
|---|---|---|---|---|---|
| JP | 2016-211072 A | | 12/2016 | | |
| KR | 10-2019-0017333 A | | 2/2019 | | |
| KR | 20190017333 A | * | 2/2019 | .......... | C04B 35/515 |
| TW | 201900584 A | | 1/2019 | | |
| WO | 2018-093414 A1 | | 5/2018 | | |
| WO | 2018-159713 A1 | | 9/2018 | | |

OTHER PUBLICATIONS

Machine Translation of JP-2003146755-A ("Suzuki") (Year: 2003).*
Tsunoura et al., "Fabrication, characterization, and fluorine-plasma exposure behavior of dense yttrium oxyfluoride ceramics," Jpn. J. Appl. Phys. 56 (2017), 06HC02 (Year: 2017).*
International Search Report (English and Japanese) of the International Searching Authority issued in PCT/JP2020/003368, mailed Mar. 24, 2020; ISA/JP (5 pages).

* cited by examiner

Example 1

Comparative Example 1

SINTERED BODY

CROSS REFERENCE TO RELATED APPLICATIONS

This application is a U.S. National Phase Application under 35 U.S.C. 371 of International Application No. PCT/JP2020/003368, filed on Jan. 30, 2020, which claims priority to Japanese Patent Application No. 2019-041275, filed on Mar. 7, 2019. The entire disclosures of the above applications are expressly incorporated by reference herein.

BACKGROUND

Technical Field

The present invention relates to a sintered material having a phase of a compound containing a rare earth element and fluorine.

Related Art

In manufacture of semiconductors, members of dry etching devices and others used in an environment containing halogen-containing gas deteriorate due to contact with halogen-containing gas, and substances in the form of particles generated through the deterioration are dispersed and attached to semiconductors, which lowers the yield of semiconductors. A compound containing a rare earth element and fluorine is known to be a material having a certain level of corrosion resistance to halogen-containing gas, and used as a material that is to be thermally sprayed onto the surface of members of semiconductor manufacturing equipment (US 2015/0096462A1), or as a sintered material for semiconductor manufacturing equipment (US 2017/0305796A1). US 2017/0305796A1 discloses that a sintered product of a compound containing a rare earth element and fluorine is denser than a thermally sprayed film of a compound containing a rare earth element and fluorine, and is suitable for constituent members of semiconductor manufacturing equipment.

However, a sintered product of a compound containing a rare earth element and fluorine still has room for improvement in terms of corrosion resistance to halogen-based plasma.

Accordingly, it is an object of the present invention to provide a sintered product of a compound containing a rare earth element and fluorine which has better corrosion resistance to halogen-based plasma than ever.

SUMMARY

The inventors of the present invention have conducted an in-depth study on the features of a sintered product of a compound containing a rare earth element and fluorine in order to increase the corrosion resistance thereof to halogen-based plasma. As a result, it has been found that increasing the whiteness of a sintered product of the compound leads to effective improvement in corrosion resistance thereof to halogen-based plasma.

The present invention provides a sintered material having a phase of a compound at least containing a rare earth element and fluorine, the sintered material having an L* value of 70 or more in the L*a*b* color space.

DETAILED DESCRIPTION

Figure 1:
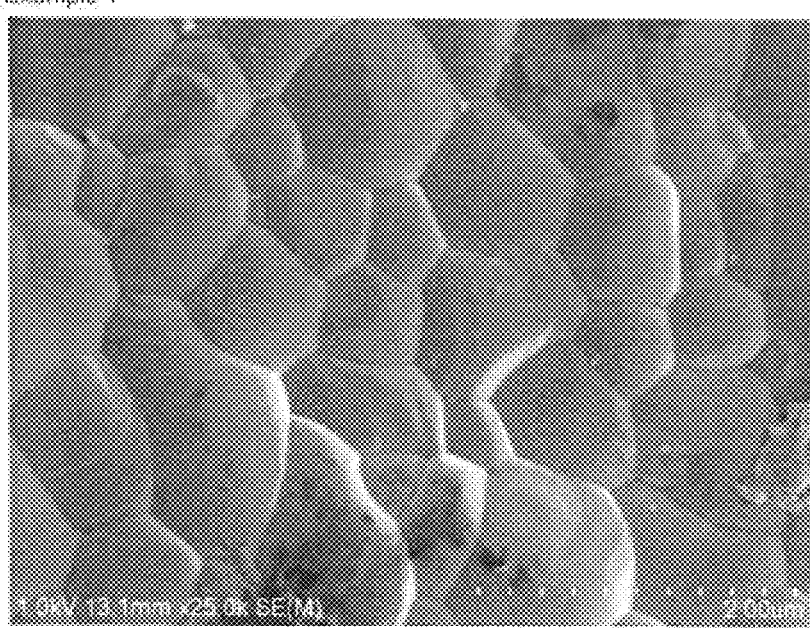
FIG. 1 is a scanning electron microscopic image of a sintered material obtained in Example 1.

Hereinafter, the present invention will be described by way of preferred embodiments.

(1) Composition of Sintered Material of Present Invention

According to an aspect, the sintered material of the present invention has a phase of a compound containing a rare earth element and fluorine (hereinafter also referred to simply as a "compound containing Ln and F").

Examples of the rare earth element (Ln) include 16 elements consisting of scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). The compound containing Ln and F contains at least one of these 16 rare earth elements. In view of further increasing the thermal resistance, the wearing resistance, the corrosion resistance, and the like of the sintered material, of these elements, it is preferable to use at least one selected from the group consisting of yttrium (Y), cerium (Ce), samarium (Sm), gadolinium (Gd), dysprosium (Dy), erbium (Er), and ytterbium (Yb), and more preferable to use yttrium (Y).

Preferable examples of the compound containing Ln and F include rare earth element fluoride and/or rare earth element oxyfluoride. In view of increasing the corrosion resistance of the sintered material to halogen-based plasma, the compound containing Ln and F preferably includes a compound containing Ln, F, and O, and is more preferably rare earth element oxyfluoride, or rare earth element oxyfluoride and rare earth element fluoride.

The rare earth element fluoride is preferably represented by $LnF_3$.

The rare earth element oxyfluoride (hereinafter also referred to as "Ln—O—F") is a compound constituted of a rare earth element (Ln), oxygen (O), and fluorine (F). Examples of Ln—O—F include a compound that has a molar ratio between a rare earth element (Ln), oxygen (O), and fluorine (F), Ln:O:F, of 1:1:1 (LnOF), and rare earth element oxyfluorides in other forms ($Ln_5O_4F_7$, $Ln_7O_6F_9$, $Ln_4O_3F_6$, etc.). In view of ease of production of oxyfluorides and higher corrosion resistance, which is an effect of the present invention, Ln—O—F is preferably represented by $LnO_xF_y$, wherein $0.3 \leq x \leq 1.7$, $0.1 \leq y \leq 1.9$. In particular, from the above-mentioned point of view, it is more preferable in the formula above that $0.35 \leq x \leq 1.65$, and even more preferable that $0.4 \leq x \leq 1.6$. Also, it is more preferable that $0.2 \leq y \leq 1.8$, and even more preferable that $0.5 \leq y \leq 1.5$. Furthermore, it is preferable in the formula above that $2.3 \leq 2x+y \leq 5.3$ be satisfied, more preferable that $2.35 \leq 2x+y \leq 5.1$ be satisfied, and even more preferable that $2x+y=3$ be satisfied.

The sintered material of the present invention preferably contains a phase of a compound containing Ln and F, and more preferably contains a phase of a compound containing Ln, F, and O. Whether a sintered material contains a phase of a compound containing Ln and F or contains a phase of a compound containing Ln, F, and O (e.g., a phase of Ln—O—F) can be confirmed by X-ray diffraction analysis.

In view of increasing the corrosion resistance to halogen-based plasma, the sintered material of the present invention preferably has a phase (crystal phase) of a compound containing Ln and F as the main phase. The main phase means a phase derived from a substance exhibiting a peak with the largest peak height among all peaks exhibited in the range of 2θ=10 to 90 degrees in X-ray diffraction using Cu-Kα rays or Cu-Kα$_1$ rays. Accordingly, whether the sintered material of the present invention has a phase of a compound containing Ln and F as the main phase can be confirmed by checking that the peak with the largest peak height, among all peaks exhibited in the range of 2θ=10 to 90 degrees in X-ray diffraction using Cu-Kα rays or Cu-Kα$_1$ rays, is a peak assigned to a compound containing Ln and F. For example, whether the sintered material of the present invention has a phase of a compound containing Ln, F, and O (e.g., a phase of Ln—O—F) as the main phase can be confirmed by checking that the peak with the largest peak height, among all peaks exhibited in the range of 2θ=10 to 90 degrees in X-ray diffraction using Cu-Kα rays or Cu-Kα$_1$ rays, is a peak assigned to a compound containing Ln, F, and O (e.g., a phase of Ln—O—F). The sintered material of the present invention more preferably has a phase of a compound containing Ln, F, and O as the main phase, and even more preferably has a phase of Ln—O—F as the main phase. When the sintered material has a phase of a compound containing Ln, F, and O as the main phase, it may or may not further have another crystal phase, and preferably has a phase of $LnF_3$ as a sub phase if any.

In view of further increasing the corrosion resistance, in X-ray diffraction analysis of the sintered material of the present invention in the range of 2θ=10 to 90 degrees using Cu-Kα rays or Cu-Kα$_1$ rays, the peak height of the peak with the largest height among peaks assigned to components other than the compound containing Ln and F is preferably 10% or less, more preferably 5% or less, and even more preferably 3% or less, based on the peak height of the main peak assigned to the compound containing Ln and F, and, even more preferably, any peaks assigned to components other than the compound containing Ln and F are not exhibited. The unit of the peak height is cps.

It is sufficient that the above-described features be satisfied in X-ray diffraction analysis using either Cu-Kα rays or Cu-Kα$_1$ rays, and the above-described features does not have to be satisfied in X-ray diffraction analysis using both of Cu-Kα rays and Cu-Kα$_1$ rays. The X-ray diffraction analysis used in the present invention is according to the powder X-ray diffractometry.

The sintered material of the present invention preferably has either one or both of a phase of rare earth element fluoride and a phase of rare earth element oxyfluoride. When the sintered material of the present invention has a phase of rare earth element fluoride and a phase of rare earth element oxyfluoride, whichever of these phases may be the main phase; however, the rare earth element oxyfluoride is preferably the main phase in view of corrosion resistance to halogen-based plasma.

For example, if the sintered material of the present invention has a phase of rare earth element fluoride and a phase of rare earth element oxyfluoride, the peak height of the peak assigned to the (020) plane of the rare earth element fluoride is preferably from 5 to 70%, and more preferably from 10 to 40%, based on the peak height of the main peak assigned to the phase of the rare earth element oxyfluoride in X-ray diffraction in the range of 2θ=10 to 90 degrees using Cu-Kα rays or Cu-Kα$_1$ rays. For example, in X-ray diffraction using Cu-Kα rays or Cu-Kα$_1$ rays, a peak assigned to the (020) plane of yttrium fluoride is typically exhibited at or around 26.0, specifically in the range from 25.9 to 26.1 degrees. For example, when the rare earth element is yttrium, the main peak positions of yttrium fluoride and yttrium oxyfluoride may overlap each other. Thus, for the sake of convenience, the presence of rare earth element fluoride herein is confirmed by a peak assigned to the (020) plane of rare earth element fluoride. Among yttrium oxyfluorides, the main peak of YOF is observed at 28.0 to 29.0 degrees, and the main peak of $Y_5O_4F_7$ is typically observed at 27.5 to 28.5 degrees.

(2) L* Value

The sintered material of the present invention, which has an L* value of 70 or more in the L*a*b* color space, that is, the L*a*b* color system coordinates, has high corrosion resistance to halogen-based plasma. The reason for this is probably as follows. The compound containing Ln and F is a white powder before sintering. However, when producing a sintered material from this powder, it is necessary to perform firing typically at 1200° C. or more for producing a sintered material with a certain level of strength using an ordinary sintering method such as hot pressing. When firing is performed at 1200° C., fluorine in the powder actively moves and reacts, which easily causes a change in the composition, such as desorption or defects of fluorine, and also desorption or defects of oxygen are likely to occur if the powder contains oxygen. When firing is performed at 1200° C. or more in particular in a low oxygen state, desorption or defects of fluorine or oxygen are likely to occur. These defects are likely to cause gray or black coloring.

On the other hand, if sintering is performed at less than 1200° C., it is easy to obtain a sintered material with substantially the same composition as that of the precursor powder even with firing in air or in a low oxygen state. In particular, spark plasma sintering (SPS), pulse electric current sintering other than SPS, or the like enables sintering of rare earth oxyfluoride or rare earth fluoride at a low temperature in a relatively short period of time, and thus are likely to cause less defects, to thereby obtain a sintered material whose whiteness is maintained. It is considered that such a white sintered material has high corrosion resistance to halogen-based plasma because it has less defects of fluorine or oxygen. The whiteness can be measured using a color difference meter, and can be determined according to the L* value measured on the sintered material surface.

From the above-described point of view, the sintered material of the present invention has an L* value of preferably 75 or more, and more preferably 80 or more in the L*a*b* color system coordinates, in view of further increasing the corrosion resistance to halogen-based plasma.

As for the upper limit, the L* value in the L*a*b* color system coordinates is preferably 95 or less, and more preferably 90 or less, in view of easily producing the sintered material.

(3) a* Value and b* Value

The sintered material having a phase of a compound containing Ln and F has an a* value of typically −1 to 3, and preferably 0 to 1, in the L*a*b* color system coordinates. The sintered material having a phase of a compound containing Ln and F has a b* value of typically −1 to 3, and preferably 0 to 1, in the L*a*b* color system coordinates. A sintered material having the a* value and b* value within the above-mentioned ranges is preferable because these values means that the sintered material has been prevented from coloring due to, for example, a change in the composition during production.

A sintered material having the a* value and b* value within the above-mentioned ranges can be obtained using a preferred sintered material producing method, which will be described later.

(4) Average Grain Size of Crystal Grains

The sintered material of the present invention preferably has a small average grain size of crystal grains, in view of being a dense sintered material to secure the corrosion resistance to halogen-based plasma. The average grain size of the crystal grains is preferably 10 μm or less.

A sintered material having an average grain size of crystal grains equal to or less than the above-mentioned upper limit can be obtained using the SPS (spark plasma sintering) method. In SPS, typically, a precursor powder is filled into a sintering mold, a DC pulse current is applied thereto, and sintering is performed by utilizing self-heat generation of the sintering mold to which the electrical energy is directly applied, together with pressing, as driving force for sintering. In SPS, it is possible to perform sintering typically at a lower temperature in a shorter period of time compared with other methods. Thus, SPS, which performs sintering at a low temperature in a short period of time, can suppress the grain growth. In particular, according to SPS, the portion to be heated is limited only to areas around and inside the sintering mold, then less heat is needed for heating material, which enables rapid heating. The grain growth can be further reliably suppressed by rapidly increasing the temperature in a lower temperature range with application of pressure.

On the other hand, in hot pressing, it is necessary to sinter at a high temperature for a long period of time although pressing is performed, and, furthermore, it takes time to increase the temperature, as shown in later-described Comparative Examples 1 to 3. Thus, in hot pressing, the grain growth is large, and accordingly, the average grain size of the crystal grains cannot be limited to 10 μm or less. Furthermore, when sintering is performed at a high temperature of 1200° C. or more, the grain growth is generally likely to occur to fail to limit the average grain size of the crystal grains to 10 μm or less.

In view of further increasing the corrosion resistance of the sintered material of the present invention, the average grain size of the crystal grains is preferably 10 μm or less, more preferably 5 μm or less, and even more preferably 3 μm or less. The average grain size of the crystal grains of the sintered material is preferably 0.1 μm or more, because such a size indicates that the sintering has progressed to secure the strength of the sintered material. The average grain size of crystal grains of a sintered material can be measured using a method described in Examples below.

(5) Strength

The sintered material of the present invention preferably has a certain level or more of strength, whereby the sintered material has high thermal stress, thermal shock, wearing resistance, and processability. Specifically, the sintered material of the present invention has a three-point flexural strength of preferably 100 MPa or more, and more preferably 110 MPa or more. The higher the three-point flexural strength of the sintered material, the better; however, in view of ease of production of the sintered material, the three-point flexural strength is preferably 500 MPa or less. A sintered material with the above-mentioned strength can be obtained using SPS in a vacuum atmosphere. A sintered material with the above-mentioned strength can be specifically obtained by producing the sintered material of the present invention through a preferred producing method, which will be described later. The three-point flexural strength can be measured using a method described in Examples below.

(6) Oxygen Content

The sintered material of the present invention may contain oxygen in addition to the rare earth element and fluorine, and, in that case, the oxygen content is preferably 13% by mass or less in view of securing high corrosion resistance to halogen-based plasma and halogen-containing gas. From this point of view, the sintered material of the present invention has an oxygen content of more preferably 10% by mass or less, and even more preferably 9% by mass or less. The oxygen content of the sintered material may be zero; however, if the sintered material contains oxygen in addition to the rare earth element and fluorine, the oxygen content is preferably 0.3% by mass or more, and more preferably 1% by mass or more, in view of securing high corrosion resistance to oxygen-based plasma and oxygen-containing gas. The oxygen content of a sintered material can be measured, for example, using an oxygen/nitrogen analyzer EMGA-920 manufactured by Horiba, Ltd. The oxygen content as described above can be realized by adjusting the oxygen content in the precursor powder to the above-mentioned preferable range of the oxygen content of the sintered material, in a preferred sintered material producing method, which will be described later.

(7) Relative Density

The sintered material preferably has a relative density of 95% or more. The relative density is a value obtained by dividing the actual measured density of a sintered material by the theoretical density (also referred to as a "calculated density") and multiplying the quotient by 100. The actual measured density of a sintered material is obtained using the Archimedes' method. The theoretical density of a sintered material varies according to the composition. The theoretical density of $Y_5O_4F_7$ is 5.15 to g/cm$^3$, and the theoretical density of YOF is 5.23 g/cm$^3$. The sintered material has a relative density of preferably 95% or more, more preferably 97% or more, and even more preferably 98% or more, in view of obtaining a sintered material with high corrosion resistance and high strength. From the same point of view, a sintered material containing $Y_5O_4F_7$ as the main phase has an actual measured density of preferably 4.80 g/cm$^3$ or more, and more preferably 4.90 g/cm$^3$ or more. A sintered material containing YOF as the main phase has an actual measured density of preferably 4.85 g/cm$^3$ or more, and more preferably 4.95 g/cm$^3$ or more.

(8) Thickness

There is no limitation on the shape of the sintered material of the present invention. For example, the thickness thereof is preferably approximately from 0.1 to 500 mm, more preferably approximately from 0.5 to 100 mm, and even more preferably approximately from 1 to 30 mm, in view of successful application of the sintered material to the above-mentioned various uses. The thickness herein does not necessarily require that the sintered material be in the shape of a plate or a film, and means the height when the sintered material is placed on a horizontal plane such that the horizontally projected area is largest, regardless of the shape of the sintered material.

(9) Preferred Producing Method

Next, a preferred method for producing the sintered material of the present invention will be described. In this producing method, the precursor powder containing a compound containing Ln and F is preferably subjected to sintering using the SPS method at a temperature of less than 1200° C., more preferably subjected to sintering using the SPS method in a vacuum atmosphere at a temperature of 800° C. or more and less than 1200° C., and even more preferably subjected to sintering using the SPS method in a vacuum atmosphere at a temperature of 800° C. or more and less than 1200° C. and a pressure of 20 to 100 MPa.

The compound containing Ln and F used as the precursor for the sintered material is typically in the form of a powder. The powder form herein also encompasses a granular form. The compound containing Ln and F used as the precursor for the sintered material preferably has a composition that corresponds to the composition of a target sintered material. Accordingly, rare earth element fluoride and/or rare earth element oxyfluoride is preferably used as the compound containing Ln and F used as the precursor for the sintered material. For example, when it is intended to obtain a sintered material only having a phase of rare earth element fluoride, a powder of rare earth element fluoride may be used as the precursor powder. When it is intended to obtain a sintered material having a phase of rare earth element oxyfluoride, it is preferable to use as the precursor powder a powder of rare earth element oxyfluoride that is to constitute a phase of a target sintered material, in view of obtaining a sintered material with a uniform composition. Accordingly, when it is intended to obtain a sintered material only having an LnOF phase, it is preferable to use a powder of LnOF as the precursor powder, and, when it is intended to obtain a sintered material only having a phase of $Ln_5O_4F_7$, it is preferable to use a powder of $Ln_5O_4F_7$ as the precursor powder. Similarly, when it is intended to obtain a sintered material having a phase of rare earth element fluoride and a phase of rare earth element oxyfluoride, it is preferable to use a powder containing rare earth element fluoride and rare earth element oxyfluoride as the precursor powder, in view of obtaining a sintered material with a uniform composition. These precursor powders may be in the form of granules. For example, when it is intended to obtain a sintered material having a phase of rare earth element fluoride and a phase of rare earth element oxyfluoride, it is preferable to use 10 to 1020 parts by mass of rare earth element fluoride with respect to 100 parts by mass of rare earth element oxyfluoride, and more preferable to use 20 to 250 parts by mass of rare earth element fluoride with respect to 100 parts by mass of rare earth element oxyfluoride, in view of obtaining a sintered material excellent particularly in terms of corrosion resistance to halogen-based plasma. When it is intended to obtain a sintered material having a phase of rare earth element oxyfluoride, a powder obtained by mixing rare earth element oxide $Ln_2O_3$ and rare earth element fluoride $LnF_3$ may also be used as the precursor powder. The mixing ratio between $Ln_2O_3$ powder and $LnF_3$ powder is adjusted such that the mixture thereof has an oxygen content of preferably 0.3 to 10% by mass, and more preferably 1 to 9% by mass. A powder containing rare earth element oxyfluoride may be produced by mixing $Ln_2O_3$ and $LnF_3$ to the above-mentioned preferable oxygen content of the sintered material, and then firing the mixture. The firing temperature is preferably from 600 to 1100° C., and more preferably from 800 to 1000° C., in view of successfully producing rare earth element oxyfluoride. The firing atmosphere may be an inert atmosphere such as argon or an oxidizing atmosphere such as air.

If the powder of a compound containing Ln and F contained in the precursor powder is not in the form of a granulated powder, the average particle size thereof is preferably 10 μm or less in view of obtaining a sintered material with preferable physical properties such as high density and corrosion resistance. The powder of a compound containing Ln and F as the precursor has an average particle size of, for example, preferably 0.1 μm or more, in view of availability of the precursor, ease of filling, high moldability and composition stability. Furthermore, in view of obtaining a sintered material with preferable physical properties such as high density and corrosion resistance, the powder of a compound containing Ln and F contained in the precursor powder has an average particle size of preferably 0.5 to 8 μm, and more preferably 0.7 to 5 μm. If the powder of a compound containing Ln and F is in the form of a granulated powder, the average particle size thereof is preferably 10 to 50 μm, and more preferably 20 to 48 μm, in view of obtaining a sintered material with preferable physical properties such as high density and corrosion resistance. Also, the precursor powder containing a compound containing Ln and F preferably has an average particle size within the above-mentioned preferable range of the average particle size of the powder of a compound containing Ln and F. The above-mentioned average particle sizes of the powder of a compound containing Ln and F and the precursor powder are a 50% volume-cumulative diameter (hereinafter alternatively referred to simply as "D50"), and are measured using a laser diffraction/scattering particle size distribution measuring method. The specific measuring method is described below. In measurement of the average particle size using the following method, granulated powders are not subjected to ultrasonic treatment as pre-treatment, but powders other than granulated powders are subjected to ultrasonic treatment at 300 W for 5 minutes as pre-treatment.

Method for Measuring Average Particle Size

The average particle size is measured using a Microtrac HRA manufactured by Nikkiso Co., Ltd. In measurement, 2 mass % aqueous solution of sodium hexametaphosphate is used as a dispersion medium, and a sample is fed to a sample circulator chamber of the Microtrac HRA until the apparatus determines that the concentration reaches a proper concentration.

In this producing method, a precursor powder is filled into a sintering mold, and is then subjected to compression molding. The compression molding can be performed, for example, through uniaxial pressing, but not limited thereto. A DC pulse current may be applied to the sintering mold simultaneously with the compression molding or after the compression molding. The pressures of pressing during the compression molding and the current application are both preferably 20 MPa or more, and more preferably 25 MPa or more, in view of achieving the average grain size of the crystal grains equal to or less than the above-mentioned upper limit. Furthermore, the pressures of pressing during the compression molding and the current application are preferably 100 MPa or less, and more preferably 60 MPa or less, in view of suppressing damage to the pressing mold, for example.

If pulse electric current sintering is performed in a vacuum atmosphere, grain growth of the crystal grains can be more effectively suppressed. The absolute pressure in a vacuum atmosphere is preferably 10 Pa or less, and more preferably 8 Pa or less.

The sintering temperature is preferably less than 1200° C., more preferably 1100° C. or less, and even more preferably 1000° C. or less, in view of achieving the L* value and the average grain size of the crystal grains equal to or less than the above-mentioned respective upper limits. The sintering temperature is preferably 800° C. or more, and more preferably 900° C. or more, in view of obtaining a dense sintered material. The sintering temperature herein refers to the maximum sintering temperature.

The sintering time at the above-mentioned maximum sintering temperature is preferably 60 minutes or less, more preferably 30 minutes or less, and even more preferably 10 minutes or less, in view of suppressing grain growth and preventing coloring, for example.

The temperature increase rate during the pulse current application is preferably 2° C./min or more, more preferably 4° C./min or more, and even more preferably 10° C./min or more, in view of shortening the heating time to effectively prevent grain growth. If the temperature increase rate from normal temperature to the maximum sintering temperature is not constant, the temperature increase rate herein refers to an average temperature increase rate in the entire temperature increasing period.

When increasing the temperature, pressing at the above-mentioned pressure is preferably performed throughout the period during which the temperature is increased from normal temperature to reach the maximum sintering temperature, in view of suppressing grain growth. In particular, in the case in which the temperature is increased from normal temperature to reach the maximum sintering temperature, and then kept at the maximum sintering temperature for a predetermined period of time, pressing at the above-mentioned pressure is preferably performed until the keeping time ends, in view of suppressing grain growth.

The time of a single instance of pulse current application is preferably from 10 to 100 milliseconds, and more preferably from 20 to 50 milliseconds, in view of obtaining a uniform sintered material.

The sintered material thus obtained is preferably used in a halogen-containing dry etching gas atmosphere, in view of well utilizing the corrosion resistance to halogen. Examples of the applications of the sintered material used in a halogen-containing dry etching gas atmosphere include vacuum chambers in dry etching devices, and also various other constituent members of semiconductor manufacturing equipment, such as sample stages and chucks in the chambers, shower heads, wafer holders, focus rings, etching gas-supplying ports, and exposure devices. Specific examples of the halogen-containing dry etching gas include $CHF_3$, $CF_4$, $C_2F_6$, $CF_6$, $CCl_4$, $BCl_3$, $Cl_2$, HCl, $H_2$, and Ar, and these can be used in combination as necessary.

Furthermore, the sintered material of the present invention can be used in applications such as constituent members of various plasma treatment apparatuses and chemical plants, in addition to constituent members of semiconductor manufacturing equipment. Materials for forming film, such as sputtering targets, may be excluded from the applications of the sintered material.

EXAMPLES

Hereinafter, the present invention will be described in more detail by way of examples. However, the scope of the present invention is not limited to the examples below. In the following description, "%" means "% by mass" unless otherwise specified. The average particle size of a powder in Examples and Comparative Examples below refers to the above-described D50.

Example 1 (Production of Sintered Material Containing $Y_5O_4F_7$ and $YF_3$ through SPS)

A powder obtained by mixing $Y_2O_3$ powder (with an average particle size of 3 μm) and $YF_3$ powder (with an average particle size of 6 μm) in a mass ratio of 4:9 was fired in air at 1000° C. for 5 hours to produce a powder having a mixed phase constituted of $Y_5O_4F_7$ and $YF_3$. The obtained powder having a mixed phase is slurried, and then milled, and the resultant was granulated and dried into the form of granules using a spray dryer, and further fired in air at 600° C. for 6 hours to obtain granules with an average particle size of 45 μm. When these granules were subjected to powder X-ray diffraction analysis, it was found that the crystal phase contained $Y_5O_4F_7$ as the main phase and $YF_3$ as a sub phase. In the X-ray diffraction analysis, the ratio of the peak height of the peak assigned to the (020) plane of $YF_3$ exhibited at or around 2θ=26.0 degrees to the peak height of the main peak of $Y_5O_4F_7$ exhibited at 2θ=27.5 to 28.5 degrees was 16%. No peak assigned to components other than $Y_5O_4F_7$ or $YF_3$ was exhibited (the method for the X-ray diffraction analysis was the same as the method for XRD analysis for a sintered material powder described later).

Then, 2500 g of granules having the mixed phase were placed in a cylindrical mold with a diameter of 260 mm, and subjected to pressure sintering using a pulsed electric current pressure sintering apparatus LABOX-650F (maximum pulse current power 5000 A, maximum load 60 kN). The atmosphere inside the chamber was a vacuum atmosphere at 6 Pa or less from the start of pressing. The time of a single instance of pulse current application was 40 milliseconds. The pressing condition was 30 MPa. The pressing and the current application were simultaneously started. After the temperature was increased at a temperature increase rate of 20° C./min from room temperature to 980° C., the temperature was kept for 5 minutes. Subsequently, the current application and the pressing were simultaneously ended, and the temperature was lowered to 100° C. Then the sintered material with a thickness of about 10 mm was taken out. The sintered material was subjected to powder X-ray diffraction analysis under the following conditions. Table 1 shows the results thereof. In the X-ray diffraction analysis, the ratio of the peak height of the peak assigned to the (020) plane of $YF_3$ exhibited at or around 2θ=26.0 degrees to the peak height of the main peak of $Y_5O_4F_7$ exhibited at 2θ=27.5 to 28.5 degrees was 17%. No peak assigned to components other than $Y_5O_4F_7$ or $YF_3$ was exhibited.

XRD Analysis on Sintered Material Powder

A portion of the sintered material was placed in a porcelain mortar, ethanol was added thereto dropwise in an amount such that the portion was completely covered therein, and the portion of the sintered material was milled for 10 minutes using a porcelain pestle to obtain a powder. Then, the powder was classified by a 150-μm sieve, and the material that had passed through the sieve was subjected to X-ray diffraction analysis under to the following conditions.

Apparatus: UltimaIV (manufactured by Rigaku Corporation)
    Radiation source: CuKα rays
    Tube voltage: 40 kV
    Tube current: 40 mA
    Scan speed: 2 deg/min
    Step: 0.02 degrees
    Scan range: 2θ=10-90 deg Example 2 (Production of Sintered Material Containing YOF through SPS)

A YOF powder (with an average particle size of 0.8 μm) was used instead of the granules having a mixed phase constituted of $Y_5O_4F_7$ and $YF_3$. 6 g of the YOF powder was placed in a cylindrical mold with a diameter of 20 mm, and subjected to pressure sintering using the same apparatus as in Example 1. The atmosphere inside the chamber was a vacuum atmosphere at 6 Pa or less from the start of pressing. The time of a single instance of pulse current application was 40 milliseconds. The pressing condition was 30 MPa. The pressing and the current application were simultaneously started. After the temperature was increased at a temperature increase rate of 10° C./min from room temperature to 1000° C., the temperature was kept for 5 minutes. Subsequently, the current application and the pressing were simultaneously ended, and the temperature was lowered to 100° C. to obtain a sintered material with a thickness of about 4 mm. When the sintered material was subjected to X-ray diffraction analysis under the above-listed conditions, no peak assigned to components other than YOF was exhibited.

Example 3 (Production of Sintered Material Containing $Y_5O_4F_7$ through SPS)

A $Y_5O_4F_7$ powder (with an average particle size of 1.1 μm) was used instead of the granules having a mixed phase constituted of $Y_5O_4F_7$ and $YF_3$. Furthermore, the temperature conditions were as follows: the temperature was increased to 900° C. at 4° C./min, and further increased from 900° C. to 950° C. at 2° C./min, and that temperature was kept for 5 minutes. A sintered material with a thickness of about 10 mm was obtained in the same manner as in Example 1 except for the above-described conditions. When the sintered material was subjected to X-ray diffraction analysis under the above-listed conditions, no peak assigned to components other than $Y_5O_4F_7$ was exhibited.

Comparative Example 1 (Production of Sintered Material Containing $Y_5O_4F_7$ and $YF_3$ through HP sintering)

About 200 g of granules having a mixed phase constituted of $Y_5O_4F_7$ and $YF_3$ used in Example 1 were placed in a cylindrical mold with a diameter of 76.2 mm, then placed in a carbon hot pressing mold having the same size as that of the mold, and sintered through hot pressing. In an Ar flow (at a flow rate of 2 liter/min), the temperature was increased at a temperature increase rate of 30° C./min to 900° C., further increased at 10° C./min to 1200° C., and then kept at 1200° C. for 2 hours during which uniaxial pressing was performed at a pressure of 2.94 MPa, to thereby obtain a sintered material.

Comparative Example 2 (Production of Sintered Material Containing YOF through HP Sintering)

A sintered material was produced in the same manner as in Example 2 of Patent Literature 2. Specifically, about 20 g of YOF powder (with an average particle size of 0.8 μm) was placed in a square mold with a length of 35 mm and a width of 35 mm, and subjected to primary molding at a pressure of 18.4 MPa through hydraulic pressing. The obtained material was placed in a carbon hot pressing mold having the same size as that of the square mold, and sintered through hot pressing. In an Ar flow (at a flow rate of 2 liter/min), the temperature was increased at 30° C./min to 1200° C., further increased at 10° C./min to 1600° C., and kept at 1600° C. for 1 hour, and then, the temperature was decreased at 10° C./min to 1200° C., and further decreased at 30° C./min. In the period of keeping the temperature at 1600° C. for 1 hour, uniaxial pressing was performed at a pressure of 36.7 MPa. Thus, a sintered material was obtained.

Comparative Example 3 (Production of Sintered Material Containing $Y_5O_4F_7$ through HP Sintering)

A sintered material was produced in the same manner as in Example 4 of Patent Literature 2. Specifically, about 20 g of $Y_5O_4F_7$ powder (with an average particle size of 1.1 μm) was placed in a square mold with a length of 35 mm and a width of 35 mm, and subjected to primary molding at a pressure of 18.4 MPa through hydraulic pressing. The obtained material was placed in a carbon hot pressing mold having the same size as that of the square mold, and sintered through hot pressing. In an Ar flow (at a flow rate of 2 liter/min), the temperature was increased at 30° C./min to 1200° C., and further increased at 10° C./min to 1400° C., and then the temperature was decreased at 10° C./min to 1200° C., and further decreased at 30° C./min. The time for keeping at 1400° C. was 0 hours. In the period during which the temperature was 1200° C. or more, uniaxial pressing was performed at 36.7 MPa. Thus, a sintered material was obtained.

The relative density and the oxygen content of each of the sintered materials obtained in Examples and Comparative Examples were measured using the methods described hereinbefore. Furthermore, the average grain size of the crystal grains, the L* value, the a* value, the b* value, and the three-point flexural strength were measured using the following methods. Table 1 shows the results. Table 1 also shows the results of X-ray diffraction analysis. The actual measured density of the sintered material of Example 1 was 4.96 g/cm³.

Average Grain Size of Crystal Grains (Crystal Grain Size)

The average grain size of the crystal grains was measured using the intercept method. The intercept method is as follows: a straight line is drawn on a scanning electron microscopic (SEM) image, the length in which one line extends through one grain is taken as a crystal grain size, and an average value of such crystal grain sizes is taken as an average grain size of the crystal grains. Five straight lines are drawn in parallel in the diagonal direction on an SEM image (photograph). On the rectangular SEM image (photograph), the five straight lines are drawn such that distance between two corners that face each other in the diagonal direction is divided into six equal lengths. Each of the straight lines is drawn from a grain boundary that is the closest to one of the ends in the image to a grain boundary that is the closest to the other end in the image. This processing is performed for two different fields of view. The calculation is performed using Equation 1 below, with the total length of ten straight lines in total in the two fields of view and the number of intersections with a grain boundary. Note that the number of intersections does not contain two ends of each straight line.

Equation 1: (Average grain size of crystal grains)=(Total length of ten straight lines in total in two fields of view)/{(Total number of straight lines in two fields of view)+(Total number of intersections with grain boundary on ten straight lines in total in two fields of view)}

The magnification of an SEM image is such that the number of crystal grains observed in the image is from 10 to 30 (the crystal grains that are counted here include only those that are each observed as the whole of the individual crystal grain in the image, and do not include those that are partially cut off in the image).

Each sample was broken to obtain a cross-section, and the cross-section was mirror-polished. Then, the sample was fired in an argon atmosphere and subjected to thermal etching. The firing temperature was 830° C. for Example 1 and Comparative Example 1, 1400° C. for Example 2 and Comparative Example 2, and 900° C. for Example 3 and Comparative Example 3, on the basis of the melting points of the respective sintered materials. The keeping time was 1 hour. Then, an image of the etched face was obtained using SEM.

Figure 2:
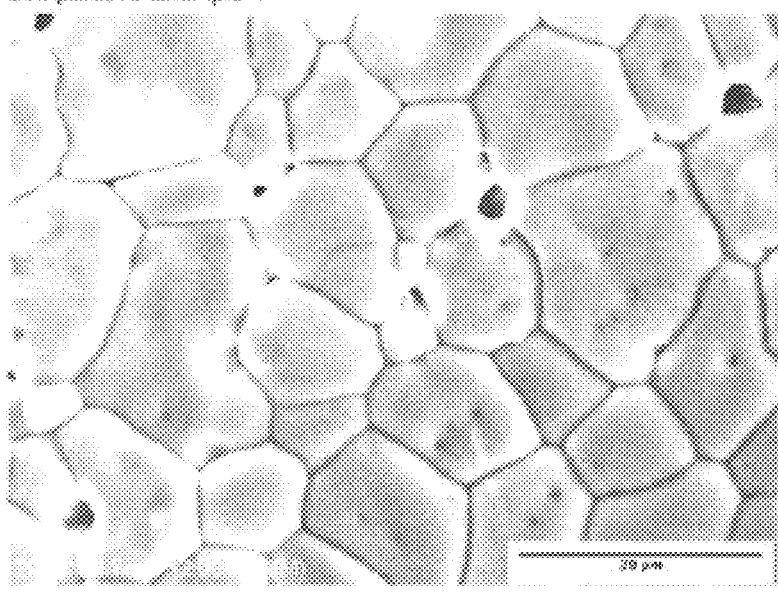
FIG. 2 is a scanning electron microscopic image of a sintered material obtained in Comparative Example 1.

FIGS. 1 and 2 show SEM images, which were used to determine the average grain sizes of the crystal grains in Example 1 and Comparative Example 1. It is clearly seen from the comparison between FIGS. 1 and 2 that the number of defects in the sintered material of Example 1 is smaller than that of Comparative Example 1.

Method for Measuring Three-Point Flexural Strength

A sintered material is cut, and the cross-section is mirror-polished, to prepare a specimen in the shape of a strip with a thickness of 1.5 to 3.0 mm, a width of about 4 mm, and a length of about 35 mm. The specimen is placed on an SiC jig, and subjected to three-point flexural strength test using a universal testing machine (model 1185, manufactured by Instron). The conditions are as follows: the distance between fulcrums is 30 mm, the crosshead speed is 0.5 mm/min, and the number of specimens is 5. The three-point flexural strength [MPa] is calculated using the following equation as defined in JIS R1601.

Three-Point Flexural Strength=$(3 \times P_f \times L)/(2 \times w \times t^2)$(MPa)

where $P_f$ is the load [N] when a specimen is broken, L is the span distance [mm], w is the width [mm] of the specimen, and t is the thickness [mm] of the specimen.

L* Value, a* Value, and b* Value

The measurement was performed using a chroma meter CR100 manufactured by Konica Minolta.

TABLE 1

| Composition | | Oxygen content (mass %) | Crystal grain size (μm) | Relative density (%) | Three-point flexural strength (MPa) | L* Value | a* Value | b* Value |
|---|---|---|---|---|---|---|---|---|
| Main phase | Sub phase | | | | | | | |
| Ex. 1 $Y_5O_4F_7$ | $YF_3$ | 3 | 1.8 | — | 245 | 82 | 0.6 | 0.3 |
| Ex. 2 YOF | None | 13 | 2 | 99.4 | 185 | 75 | 0.2 | 0.7 |
| Ex. 3 $Y_5O_4F_7$ | None | 10 | 0.8 | 99.6 | 111 | 71 | 0.4 | 0.6 |
| Com. Ex. 1 $Y_5O_4F_7$ | $YF_3$ | 3 | 12 | — | 104 | 67 | 0.4 | 0.4 |
| Com. Ex. 2 YOF | None | 11 | 25 | 99.5 | 120 | 64 | −0.1 | 0.3 |
| Com. Ex. 3 $Y_5O_4F_7$ | None | 9 | 18 | 99.8 | 26 | 68 | 0.3 | 0.6 |

(—: Calculation of an accurate theoretical density and an accurate relative density based thereon was impossible since the composition had a mixed phase.)

Method for Evaluating Number of Particles Generated

The sintered materials were subjected to plasma etching. Before performing the plasma etching, a silicon wafer with a diameter of 3 inches was placed in a chamber. Out of particles that were generated and dispersed through the etching action to attach to the surface of the silicon wafer, the number of those with a particle size of about 0.2 μm or more was counted using a magnifying lens. The plasma etching conditions were as follows, and the fluorine-based plasma was used.

Atmosphere gas $CHF_3$:Ar:$O_2$=80:160:100 mL/min

High-frequency electric power: 1300 W

Pressure: 4 Pa

Temperature: 60° C.

Etching time: 100 hours

Furthermore, the number of particles was counted in the same manner as above except that $CHF_3$ in the atmosphere gas was changed to HCl for chlorine-based plasma.

Table 2 shows the results.

TABLE 2

| | Number of particles generated | |
|---|---|---|
| | Fluorine-based plasma | Chlorine-based plasma |
| Ex. 1 | 4 | 4 |
| Ex. 2 | 6 | 7 |
| Ex. 3 | 5 | 4 |
| Com. Ex. 1 | 9 | 11 |
| Com. Ex. 2 | 15 | 13 |
| Com. Ex. 3 | 11 | 10 |

As shown above, in both the fluorine-based plasma condition and the chlorine-based plasma condition, the number of particles generated from the sintered material in Example 1 was not more than half of that in Comparative Example 1, which contained $Y_5O_4F_7$ as the main phase and $YF_3$ as a sub phase as with Example 1. Similarly, the number of particles generated from the sintered material in Example 2, which was a YOF sintered material, was significantly smaller than that in Comparative Example 2, and the number of particles generated from the sintered material in Example 3, which was a $Y_5O_4F_7$ sintered material, was significantly smaller than that in Comparative Example 3. Accordingly, it is clear that the sintered material of the present invention, which has a L+value equal to or larger than a certain value, has excellent corrosion resistance to halogen-based plasma.

INDUSTRIAL APPLICABILITY

According to the present invention, it is possible to provide a sintered material having a phase of a compound containing a rare earth element and fluorine which has better corrosion resistance to halogen-based plasma than ever.

The invention claimed is:

1. A sintered material having a phase of rare earth element oxyfluoride as a main phase, wherein the sintered material has properties including:

an L* value of 75 or more and less than 90, an a* value of −1 to 3, and a b* value of −1 to 3 in an L*a*b* color space;

a three-point flexural strength of 110 MPa or more; and a relative density of 98% or more, and crystal grains of the sintered material have an average grain size of 10 μm or less.

2. The sintered material as set forth in claim 1, wherein the sintered material contains oxygen and has an oxygen content of 13% by mass or less.

3. The sintered material as set forth in claim 1, for use in a halogen-containing dry etching gas atmosphere.

4. The sintered material as set forth in claim 1, wherein the sintered material has a phase of rare earth element fluoride as a sub phase.

5. The sintered material as set forth in claim 4, wherein a peak height of a peak assigned to a (020) plane of the rare earth element fluoride is from 5 to 70%, based on a peak height of a main peak assigned to the phase of the rare earth element oxyfluoride.

6. The sintered material as set forth in claim 1, wherein the rare earth element oxyfluoride is represented by $LnO_xF_y$, where $0.3 \leq x \leq 1.7$ and $0.1 \leq y \leq 1.9$, and the sintered material has a rare earth element fluoride that is represented by $LnF_3$.

7. The sintered material as set forth in claim 1, wherein the three-point flexural strength of the sintered material is 500 MPa or less.

8. The sintered material as set forth in claim 1, wherein relative to a main peak assigned to a phase of the rare earth oxyfluoride, a peak height of a largest peak attributable to a component in the sintered material other than a compound containing Ln and F in the sintered material is 10% or less.

9. The sintered material as set forth in claim 1, wherein the average crystal grain size is 5 μm or less.

\* \* \* \* \*